United States Patent
Schreter et al.

(10) Patent No.: US 10,073,872 B2
(45) Date of Patent: Sep. 11, 2018

(54) HYBRID HEAP MEMORY MANAGEMENT

(71) Applicant: SAP SE, Walldorf (DE)

(72) Inventors: Ivan Schreter, Malsch (DE); Daniel Booss, Wiesloch (DE); Daniel Egenolf, Leimen (DE)

(73) Assignee: SAP SE, Walldorf (DE)

( * ) Notice: Subject to any disclaimer, the term of this patent is extended or adjusted under 35 U.S.C. 154(b) by 139 days.

(21) Appl. No.: 14/849,041

(22) Filed: Sep. 9, 2015

(65) Prior Publication Data

US 2017/0068465 A1 Mar. 9, 2017

(51) Int. Cl.
*G06F 12/06* (2006.01)
*G06F 17/30* (2006.01)

(52) U.S. Cl.
CPC ........ *G06F 17/30312* (2013.01); *G06F 12/06* (2013.01); *G06F 2212/1024* (2013.01)

(58) Field of Classification Search
CPC .... G06F 3/0613; G06F 3/0631; G06F 3/0673; G06F 17/30312; G06F 12/06; G06F 2212/1024
See application file for complete search history.

(56) References Cited

U.S. PATENT DOCUMENTS

| | | | | |
|---|---|---|---|---|
| 6,427,195 B1 * | 7/2002 | McGowen | ............ | G06F 9/5016 711/153 |
| 2002/0016878 A1 * | 2/2002 | Flores | ..................... | G06F 8/457 710/200 |
| 2009/0300638 A1 * | 12/2009 | Gustafsson | ........... | G06F 9/5016 718/104 |
| 2010/0211756 A1 * | 8/2010 | Kaminski | ............. | G06F 12/023 711/172 |
| 2010/0299672 A1 * | 11/2010 | Tagawa | ............... | G06F 12/0223 718/104 |
| 2011/0302388 A1 * | 12/2011 | Reynya | ................. | G06F 12/023 711/171 |
| 2012/0110294 A1 * | 5/2012 | Inoue | .................. | G06F 12/0253 711/171 |
| 2013/0346378 A1 * | 12/2013 | Tsirogiannis | ......... | G06F 12/023 707/693 |

OTHER PUBLICATIONS

Vangelis Tsiatsianas "Memory, Part 2: Implementing a Memory Allocator", Feb. 23, 2015. GitHub https://github.com/angrave/SystemProgramming/wiki/Memory,-Part-2:-Implementing-a-Memory-Allocator/9c70b4f58363bb658cea91c88ece71a17ac2f84b.*

(Continued)

*Primary Examiner* — Rocio Del Mar Perez-Velez
(74) *Attorney, Agent, or Firm* — Mintz Levin Cohn Ferris Glovsky and Popeo, P.C.

(57) ABSTRACT

A database memory manager determines a size class for each of a plurality of memory allocation requests. The memory manager then, based on the determined size classes, assigns which of a plurality of sub-allocators forming part of a plurality of memory pools should handle each memory allocation request. The sub-allocators assignments are based on predefined size ranges for each size class. The corresponding assigned sub-allocators then identify locations within the memory for each memory allocation request. The corresponding assigned sub-allocators next handle the memory allocation requests to allocate memory at the identified locations such that one of the sub-allocators utilizes both thread local storage and core-striped memory management.

21 Claims, 11 Drawing Sheets

(56) References Cited

OTHER PUBLICATIONS

"A Scalable Concurrent malloc(3) Implementation for FreeBSD", Jason Evans, Apr. 16, 2006.*

Ghemawat, Sanjay, and Paul Menage. "TCMalloc : Thread-Caching Malloc." TCMalloc : Thread-Caching Malloc. N.p., n.d. Web. May 2015. <http://goog-perftools.sourceforge.net/doc/tcmalloc.html>.

Sade, Yair, Mooly Sagiv, and Ran Shaham. "Optimizing C multithreaded memory management using thread-local storage." International Conference on Compiler Construction. Springer Berlin Heidelberg, 2005.

Walls, Colin. "Dynamic Memory Allocation and Fragmentation in C and C." Design and Reuse. N.p., n.d. Web. May 2015. <https://www.design-reuse.com/articles/25090/dynamic-memory-allocation-fragmentation-c.html>.

\* cited by examiner

HYBRID HEAP MEMORY MANAGEMENT

TECHNICAL FIELD

The subject matter described herein relates to a database memory management using a hybrid combination of thread local storage and core-striped memory management.

BACKGROUND

Requesting and releasing heap memory blocks from the operating system is an important component of computer architectures. Each insertion, update or deletion operation of a database entry can be handled by an underlying memory manager that manages free memory blocks. Due to most applications require more physical memory than it is provided by the system, modern computer architectures use often paging for handling memory requests.

Requests to receive free heap memory blocks or to release them back to the system can be handled by an allocator. It is the responsibility of the allocator to handle memory requests correctly, even if there is insufficient memory available, precisely by returning 0 in the case of insufficient memory. Another challenge is the handling of memory fragmentation, in terms of having sufficient memory that is not available in one contiguous chunk.

SUMMARY

In a first aspect, a database memory manager determines a size class for each of a plurality of memory allocation requests. The memory manager then, based on the determined size classes, assigns which of a plurality of sub-allocators forming part of a plurality of memory pools should handle each memory allocation request. The sub-allocators assignments are based on predefined size ranges for each size class. The corresponding assigned sub-allocators then identify locations within the memory for each memory allocation request. The corresponding assigned sub-allocators next handle the memory allocation requests to allocate memory at the identified locations such that one of the sub-allocators utilizes both thread local storage and core-striped memory management.

The database can take many forms. In some variations, the database is an in-memory database that uses main memory for data storage such that the memory allocation requests are for such main memory.

Each sub-allocator can have a corresponding memory pool which handles the corresponding memory allocation requests.

The sub-allocators can include a small block allocator, a page allocator, and a big block allocator. Memory allocation requests having a size class below a second threshold which is greater than the first threshold are handled by the page allocator, and other memory allocation requests are handled by the big block allocator. The small block allocator can be the sub-allocator that utilizes both thread local storage (TLS) and core-striped memory management.

A TLS small block allocator that is associated with the small block allocator can determine a sub-size class for each memory allocation request. Such TLS small block allocator can handle the memory allocation requests for the small block allocator.

The small block allocator and the page allocator can both obtain free logical pages from the page provider which, in turn, can obtain free logical pages from the big block allocator.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced database memory management techniques which provide increased performance. In particular, it will be appreciated that the usage of a hybrid TLS and core-striped MM provides significant performance improvement because the local cache can be accessed very fast and the current subject matter obviates the need for synchronization.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to database memory management techniques in which a memory manager (MM)

selectively allocates memory to various database operations. In general, the MM's responsibility is to allocate free heap memory blocks from the operating system (OS) and to manage these blocks in an efficient way in terms of reducing memory fragmentation. In contrast to conventional techniques, the MM as described herein tends to allocate all available memory even if less memory is used and does not release free memory blocks back to the OS. Depending on the underlying architecture, the system can provide free system pages with a fixed size, precisely 4 KiB by having a x86-64 (Intel) architecture. Databases, such as the SAP HANA platform, provide an efficient way of managing these system pages in terms of guaranteeing a fine-grained allocation and a low fragmentation. The current subject matter is applicable to a wide variety of database management systems including, without limitation unless otherwise specified, in-memory database systems such as the SAP HANA platform.

Figure 1:
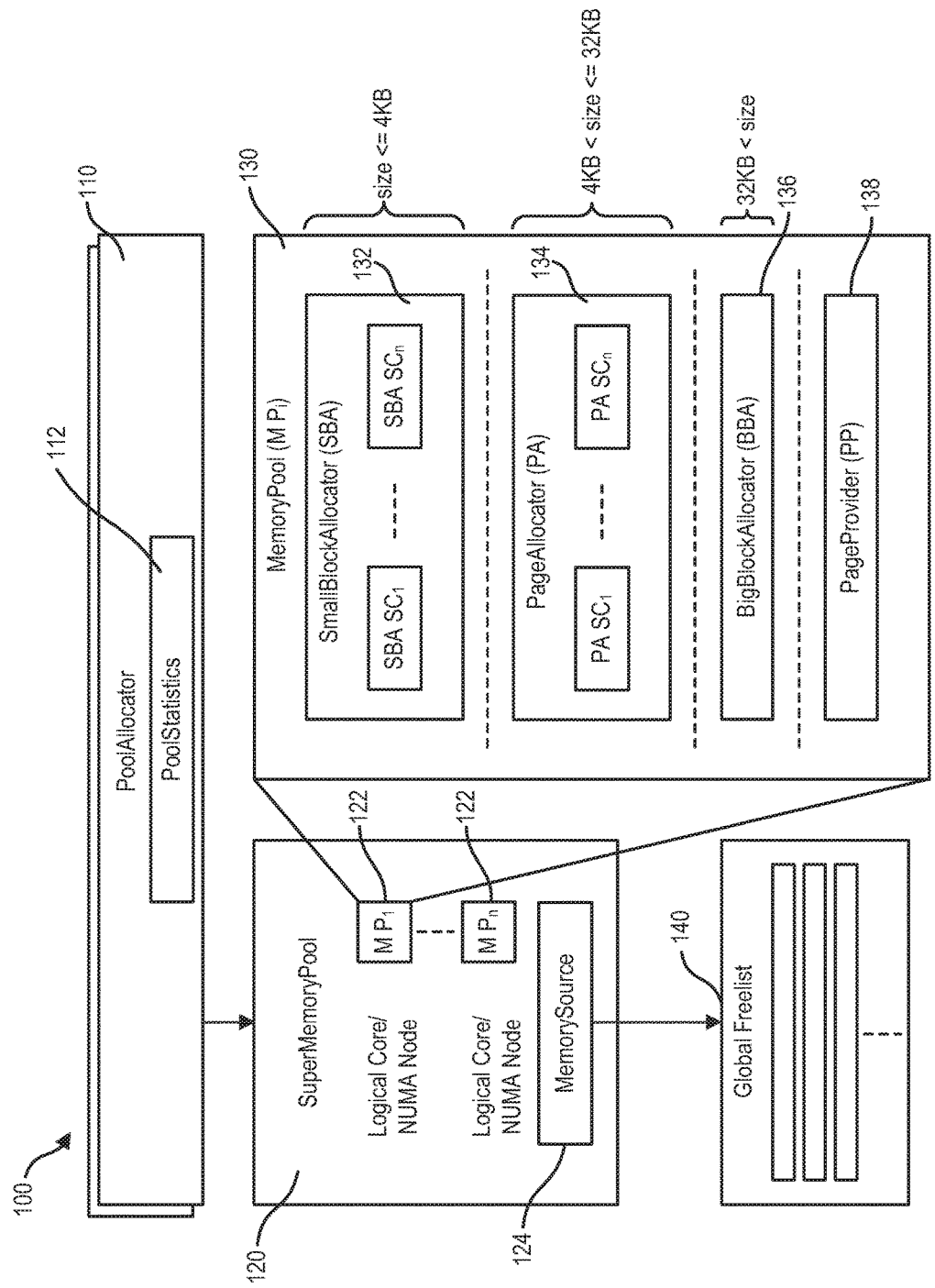
FIG. 1 is a diagram illustrating a database memory management architecture.

FIG. 1 is a diagram 100 illustrating a database memory management architecture that can supports two execution modes, namely NUMA-oblivious and NUMA-awareness. In recent years, modern systems are based on the Non-Uniform Memory Access (NUMA) architecture, where the computer memory might be distributed across a number of NUMA nodes. Therefore, SAP HANA provides the possibility that the memory manager can create exactly one dedicated allocator per logical core or NUMA node respectively.

The database (e.g., an in-memory database such as the SAP HANA platform) can use multiple PoolAllocators 110, a wrapper for the customized allocator, to allocate heap memory blocks. Additionally, each PoolAllocator 110 can collect aggregated allocation statistics and stores them by using a PoolStatistics object 112. For instance, by having this PoolStatistics object 112 it can be possible to get an overview of existing allocations and deallocations and the total number of allocated size in bytes per PoolAllocator 110. Furthermore, these statistics provide information about current out of memory situations and the distribution of used or shared memory in the overall system. With the aid of these statistics it can be possible to determine if the out of memory situations are based on errors of the used MM or not.

A SuperMemoryPool 120 can combine all MemoryPools 130 (MP) according to the total number of logical cores for providing the possibility of having exactly one dedicated allocator per logical core or NUMA node 122 respectively. This approach avoids expensive synchronizing for multi-threaded allocations because the memory manager forwards each memory request to its dedicated MP 130. By exhibiting NUMA-awareness, the allocation of heap memory blocks can be executed on its appropriate NUMA node 122 which leads to decreasing remote latency. Depending on the underlying architecture, the MP 130 can use only one dedicated sub-allocator, called BigBlockAllocator (BBA) 136, per logical core or NUMA node 122 respectively, to request memory directly from the system. Additionally, the managed blocks by this sub-allocator can first originate from a global Freelist 140 instead of using directly a system call (mmap) for getting free memory system pages from the OS. This global cache can contain completely free segments with a fixed size of 128 MB on a 64 Bit architecture. For tracking the relation between the metadata of allocated memory pages and the proper allocator, the SuperMemoryPool 120 can contain one MemorySource (MS) object 124, which can be useful for the user. In addition, this MS object 124 can provide information about the meta-data of one system page, for instance if it is reserved, free or used. This information, which can also be called level-2-map, can be is shared by all MPs 130 and can be handled by the appropriate BBAs 136 whereas the global Freelist 140 is shared by all sub-allocators per MP 130.

Additionally to the BBA, each MP can contain two more sub-allocators for handling blocks specifically depending on its size. The SmallBlockAllocator (SBA) 132 can handle memory blocks with a size less than a pre-defined amount such as 4 KiB. Similar to the first sub-allocator is the approach of the PageAllocator (PA) 134, that can be responsible for allocating memory blocks with a size of larger than the first pre-defined amount (e.g., 4 KiB, etc.) and smaller than second pre-defined amount (e.g., 32 KiB, etc.). In terms of memory fragmentation, each dedicated MP 130 can be partitioned by multiple SBAs 132 and PAs 134 per different size classes (SC). The following itemization provides an overview of example predefined block sizes.

| Size Classes for SBA (B): | { | 8, | 16, | 32, | 48, | 64, |
|---|---|---|---|---|---|---|
| | | 80, | 96, | 112, | 128, | 160, |
| | | 192, | 224, | 256, | 288, | 320, |
| | | 384, | 448, | 512, | 576, | 640, |
| | | 768, | 896, | 1024, | 1280, | 1536, |
| | | 2048, | 2560, | 3072, | 4069, | 0 } |
| SizeClasses for PA (B): | { | 4096, | 5120, | 6144, | 7168, | 8192, |
| | | 10240, | 12288, | 16384, | 21504, | 32768, 0 } |

The appropriate SC of the first sub-allocators represents the smallest sufficient block for allocating the requested memory. For instance, the adequate sub-allocator for managing a block with a size of 50 B would be $SBA\_SC_5$ that has enough capacity, precisely 64 B, for allocating the requested block. Besides these two sub-allocators, the dedicated BBA 136 need not be partitioned via different size classes and can handle all memory requests with a size of larger than 32 KiB.

In addition to these sub-allocators, each MP 120 can contain one PageProvider 138 that provides free pages for the two sub-allocators SBA 132 and PA 134.

Figure 2:
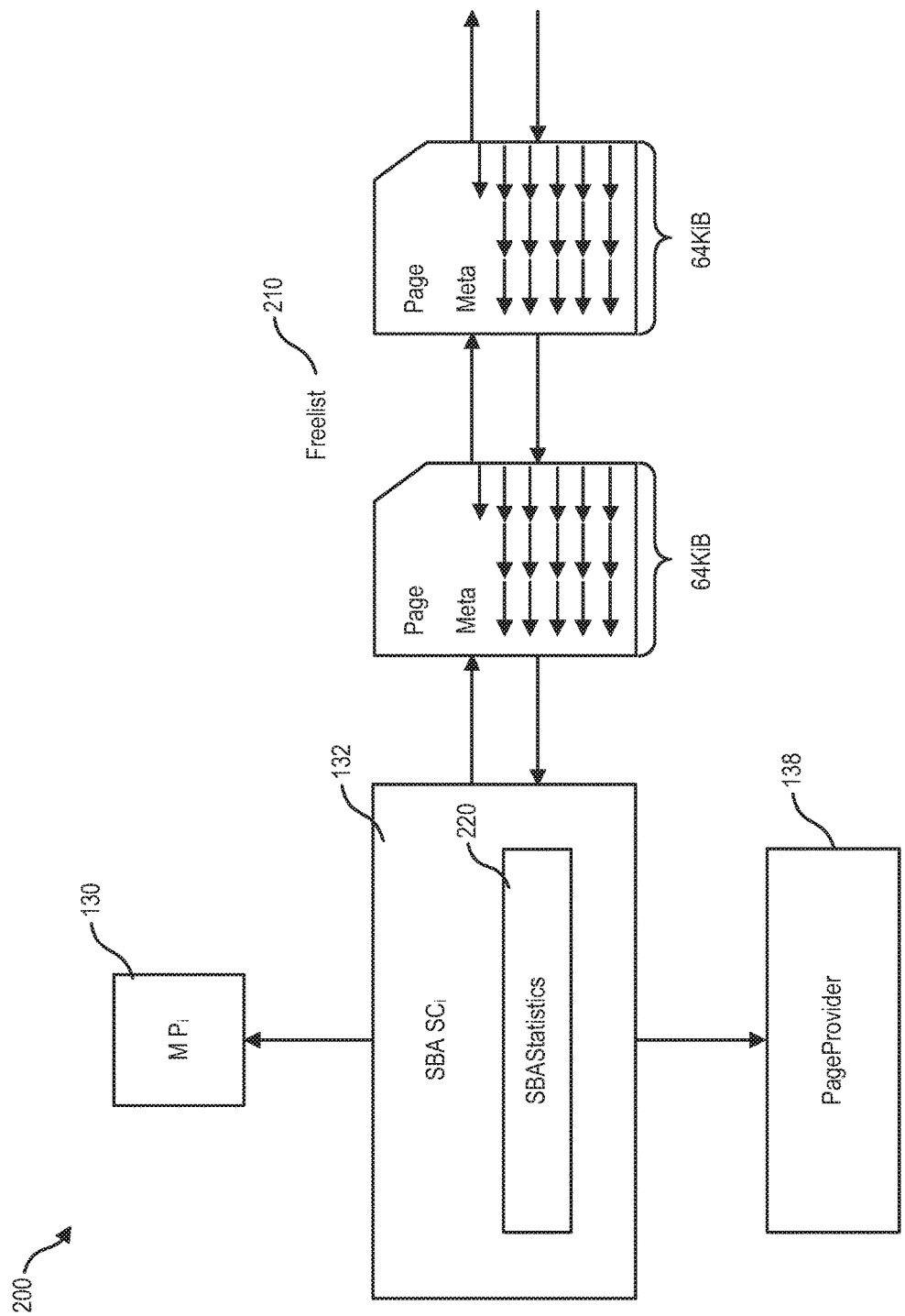
FIG. 2 is a diagram illustrating components of a SmallBlockAllocator.

FIG. 2 is a diagram 200 illustrating connected components and members of a SmallBlockAllocator. The SmallBlockAllocator (SBA) 132, which is a sub-allocator, can be responsible for handling very small block sizes. Each SBA 132 can be partitioned by different size classes which correspond to the size of its cached memory blocks. Each SBA 132 can have a pointer to a doubly-connected linked-list that contains partially free logical pages with a size of 64 KiB. By allocating memory, this SBA 132 can originate free blocks from this local Freelist 210 whereas the logical free pages are provided and handled by the appropriate PageProvider (PP) 138, which is unique for one MP 130 and can, for example, contain up to 32 completely free logical pages that are originate by using the BBA 136.

Each logical page, handled by the PP 138, can comprise a linked-list of used or free memory blocks with a size of its appropriate size class. Whereas the metadata of each logical page can be stored at the beginning of this list, the blocks can be written backwards in terms of preventing errors of the metadata when memory overflow occurs. The metadata of the SBA logical page can provide information about the LINK_INDEX, the relation between the metadata and its block, one ALLOC_CALLER, for knowing which caller has been used for the allocation, and at last some FLAGS, that saves the status of one block for instance if the appropriate block is used or not.

Similar to the collected PoolStatistics 112, the SBA 132 can contain statistics 220 which provide information about the number of used blocks, the number of currently allocated or deallocated bytes so far or the page count in use. Contrary to the PoolStatistics 132 these SBAStatistics 132 are important for the MM rather than for the user.

Figure 3:
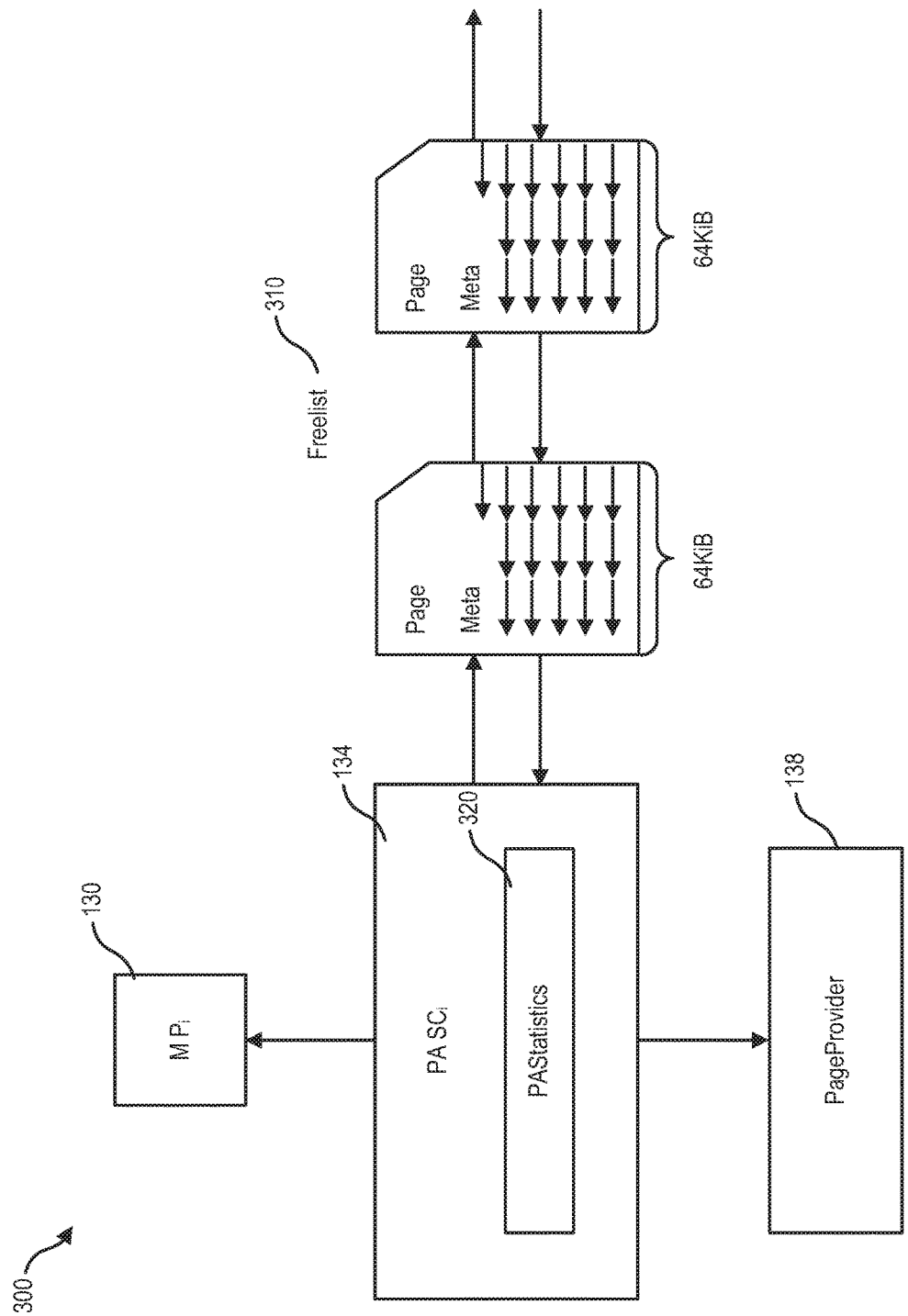
FIG. 3 is a diagram illustrating components of a PageAllocator.

FIG. 3 is a diagram 300 illustrating connected components and members of a Page Allocator (PA). This second sub-allocator PA 134 can handle medium blocks with a maximum size, for example, of 32 KiB and can contains the same components and cache variants as the SBA 132. Precisely as other sub-allocator, the PA 134 can points to its appropriate MemoryPool 130 for ensuring the relation between these components.

Besides the memory blocks stored at the local Freelist 310 and the previous described meta-data for the SBA 132, each page can contains additionally the DEALLOC_CALLER for noting the relation between the block and the caller that is responsible for its deallocation.

Figure 4:
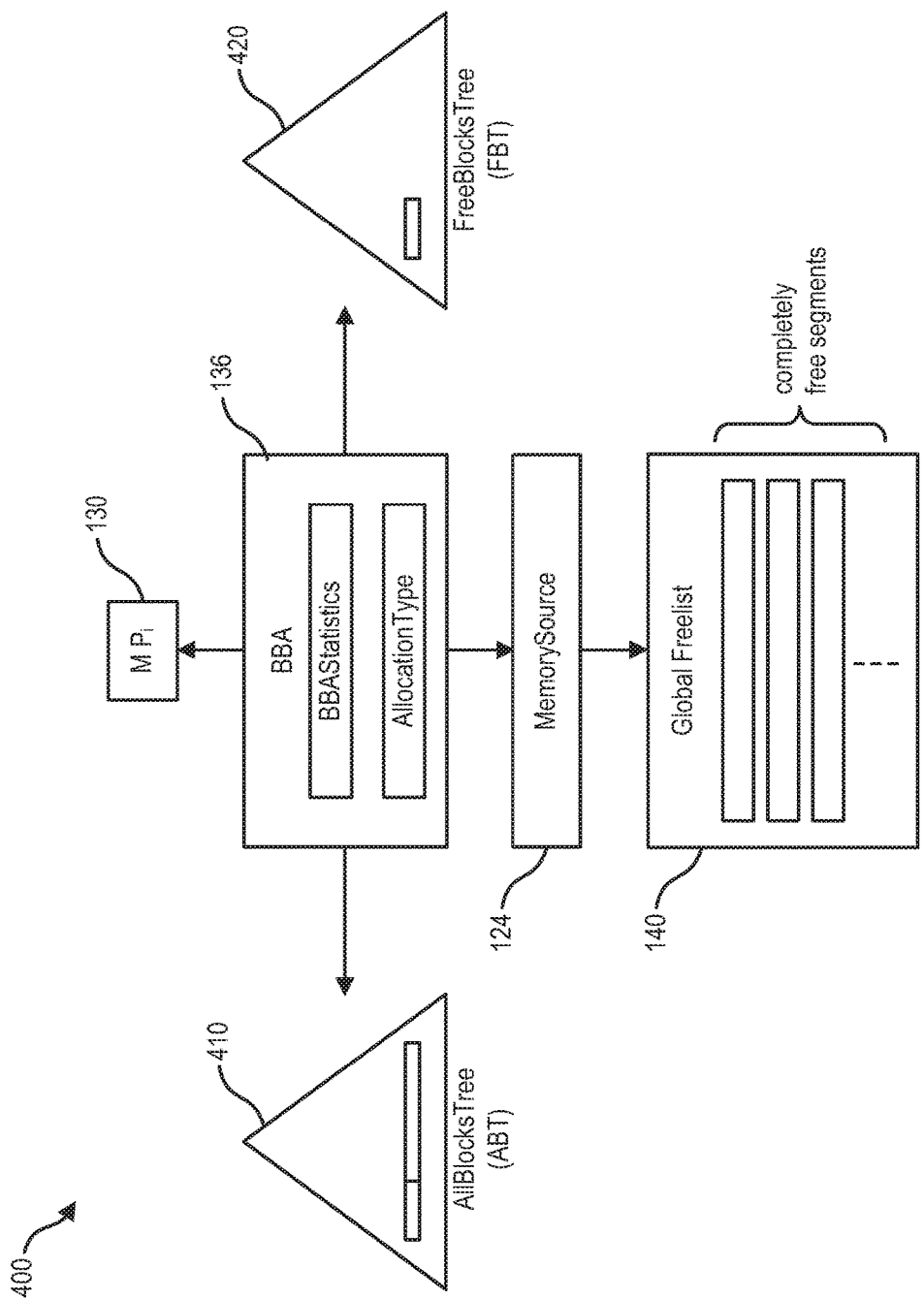
FIG. 4 is a diagram illustrating components of a BigBlockAllocator.

FIG. 4 is a diagram 400 illustrating connected components and members of a Big Block Allocator (BBA). In contrast to the first two sub-allocators, the BBA 136 need not be partitioned via different size classes and additionally can be unique per MP 130. The BBA 136 can handle huge block requests, precisely block sizes larger than 32 KiB, and provide logical pages for the PageProvider 138. Instead of using a doubly-connected linked-list as a Freelist, the BBA 136 can contain two trees 410, 42 for handling allocation and deallocation requests. The first FreeBlocksTree 420 can contain all free memory blocks whereas the data structure AllBlocksTree 410 can store both, free and already used memory blocks. This approach provides the possibility of finding the position of free blocks, to merge them if direct neighbors are free, and to release a complete segment back to the global Freelist 140. The memory blocks that originate from this global Freelist 140 can contain completely free segments with a fixed size of 128 MB per segment. The global cache structure can be accessible by using the MemorySource 124 that is shared by all MPs 130.

In addition to determining statistics about the behavior of the BBA 136, this sub-allocator can differentiate between two block types, namely PageAllocation for blocks with less size, such as less than 256 MB, and HugeBlockallocation for larger block sizes. Therefore, the BBA 136 can provide information about three different cache structures, namely its local two trees 410, 420 and the global Freelist 140.

Figure 5:
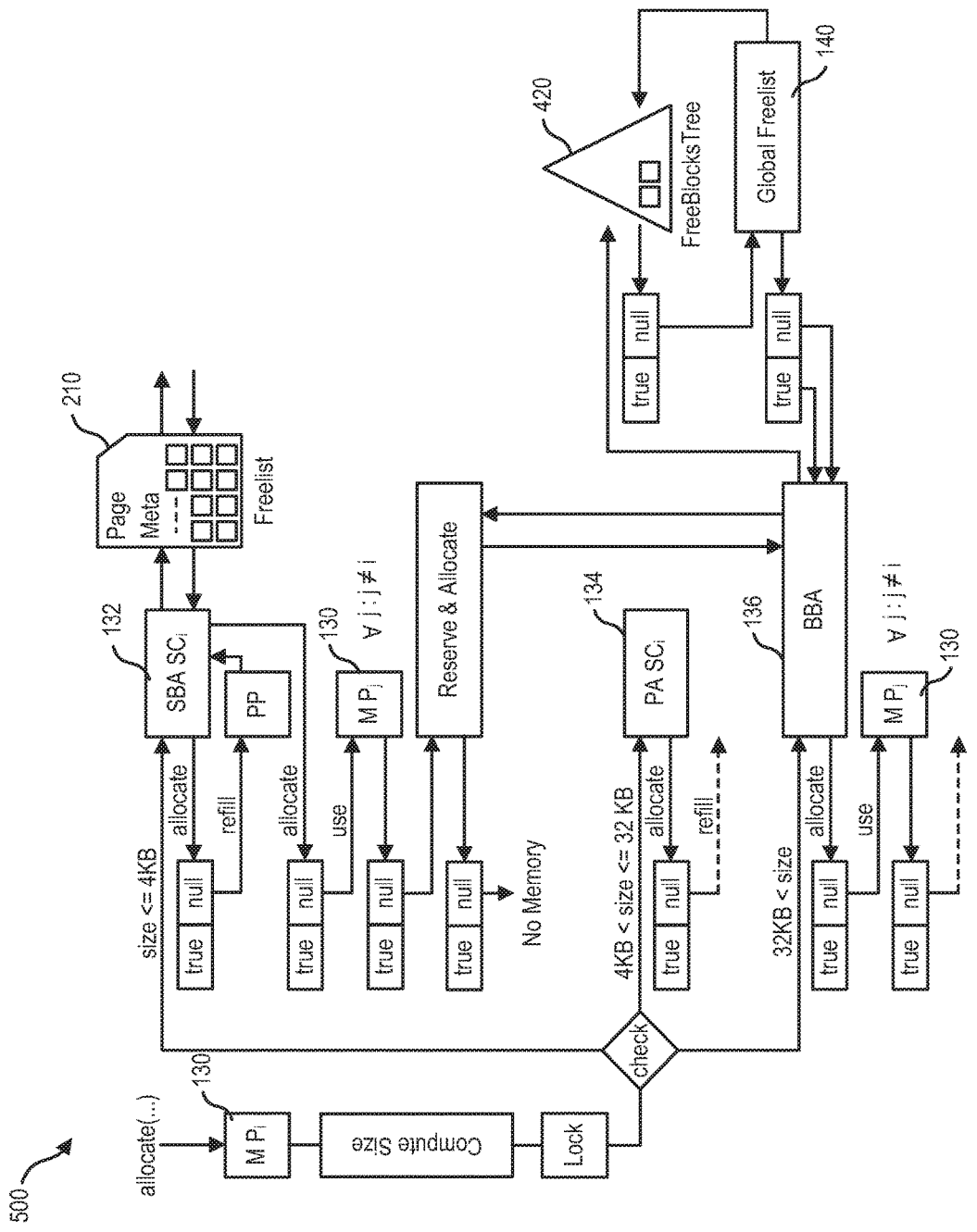
FIG. 5 is a diagram illustrating a memory management allocation process.

FIG. 5 is a diagram 500 illustrating principles of the allocation processes and introduces the different approaches of each sub-allocator. With regard to the MM architecture, each logical core or NUMA node can have a dedicated MP 130 for handling memory requests. Let $MP_i$ ($1<=i<=n$) donate the appropriate allocator for NUMA node i. Given the requested block size, the allocator can compute the actually required block size for a block in due consideration of specific flags, like FLAG_FENCE_FRONT or FLAG_FENCE_BACK for having some space before or behind the actual block. After locking the critical section, in terms of synchronization in a multi-threaded system, the $MP_i$ 130 has to decide which sub-allocator has to be used depending on the computed block size.

For small and medium block sizes, the appropriate size class has to be determined for using the suitable sub-allocator. As illustrated in FIG. 5, the SBA 132 and PA 134 can handle memory requests almost identical except based on page metadata and different size classes. Therefore, for conciseness, the following description focuses on the memory allocation process executed by the SBA 132 and BBA 136.

The MM can use four different mechanisms for allocating memory blocks, namely direct allocation, indirect allocation, borrowing memory, and reserving memory.

With direct allocation, the appropriate sub-allocator can handle the memory request and attempt to return a sufficient number of memory blocks by doing a lookup in its local cache. SBA 132 and PA 134 uses their respective local doubly-connected Freelist 210, 310 to return a pointer of free memory blocks. If this local list contains a completely free logical page, it will be released back to the PP 138. The BBA 136 can originate its free blocks from the FreeBlocksTree 420 first and than by looking up in the global Freelist 140.

With indirect allocation, if the appropriate sub-allocator SBA 132 or PA 134 cannot provide a pointer to free memory blocks, the MM tries to refill the PP 138 by inserting free logical pages into its Freelist that originate from the BBA 136. Afterwards, the allocation process can be retried by the sub-allocator.

With the borrowing memory technique, by having multiple logical cores and NUMA nodes respectively, memory can be borrowed by other MPs 130. If the appropriate allocator could not allocate memory, the MM can attempt to use neighbor MPs 130 for returning free memory.

With the reserving memory technique, the $MP_i$ 130 tries to reserve memory first by the appropriate sub-allocator and allocates the memory afterwards. By failure, the allocator returns a null pointer, indicating out of memory reason.

Figure 6:
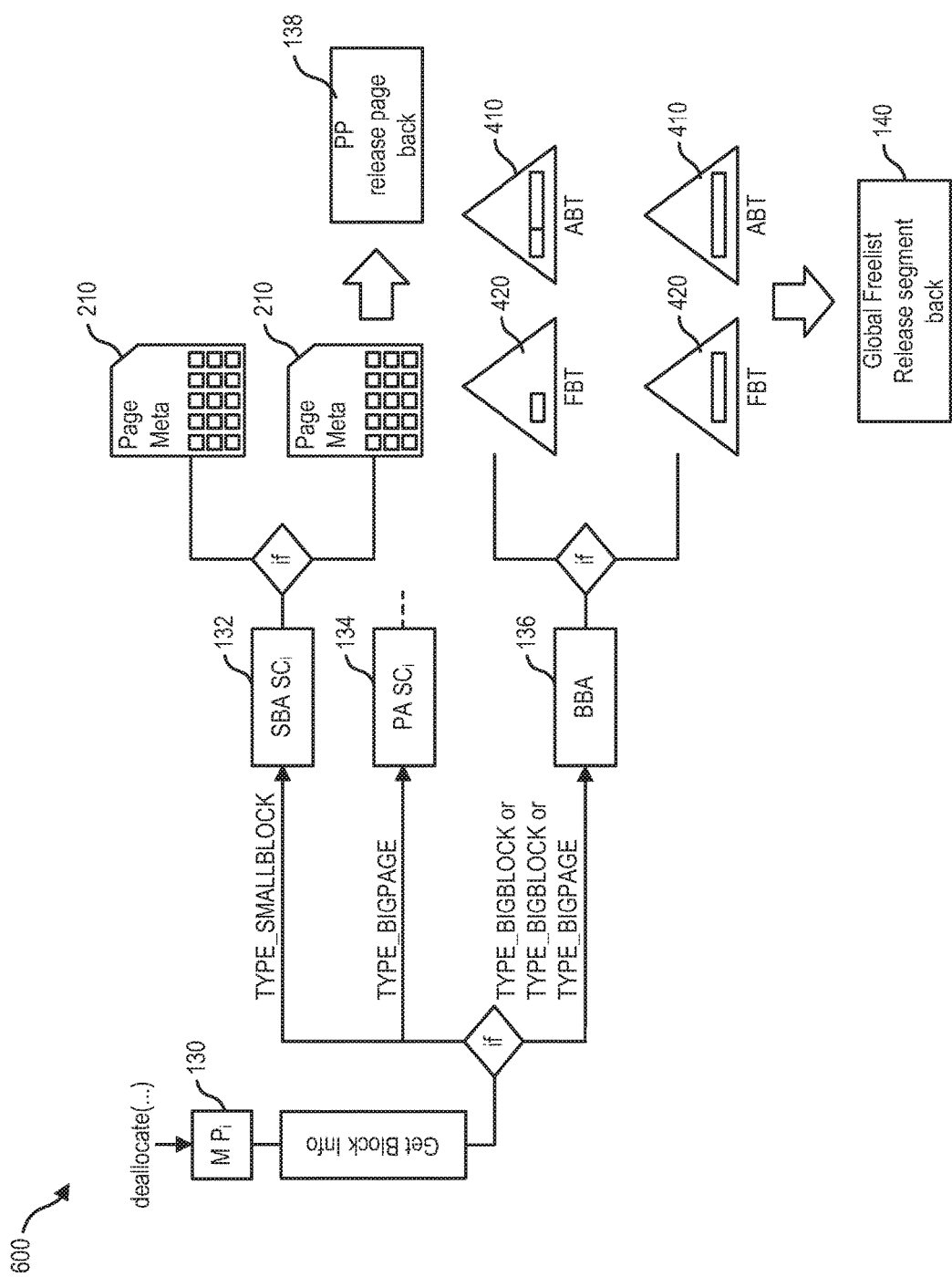
FIG. 6 is a diagram illustrating a memory management deallocation process.

FIG. 6 is a diagram 600 illustrating a memory deallocation procedure. In terms of having a customized allocator for managing heap memory blocks, the process of deallocation is necessary to release previous allocated memory blocks back to the operation system (OS). With the current subject matter, the MM does not return allocated memory blocks back to the system, but rather, caches them in the global Freelist 140, if a complete segment becomes free.

According to the MM, the appropriate MP 130 CAN differentiate between the following block types based on the previous used sub-allocator for allocation: TYPE_SMALLBLOCK, TYPE_PAGE, TYPE_BIGBLOCK, TYPE_BIGPAGE and TYPE_HUGEBLOCK. Therefore, the block information has to be determined by the $MP_i$ 130 and has to be handled differently. Whereas small blocks and pages can be handled by the SBA 132 or PA 134 respectively, the other three block types can be managed by the BBA 136.

With reference again to FIG. 6, the SBA 132 or PA 134 can be used as part of a deallocation process as follows. In general, the SBA 132 or PA 134 respectively differentiates between two cases, namely if a logical page becomes completely or partial free (which is not fully illustrated in FIG. 6 for simplicity). By releasing a block and receiving a completely free logical page the appropriate PP 138 deletes this page from the local Freelist 210. Furthermore, this provider inserts the new page into its list if the maximum of 32 logical pages is not reached or releases them to the BBA 136. If one page, contained in the local Freelist 210 of the appropriate sub-allocator, becomes partial free, the page can be kept in the local cache.

Again with reference to FIG. 6, when deallocating an appropriate memory block, the BBA 136 can update multiple caches, namely the FBT 420, storage for all free memory blocks, and ABT 410, that contains all free and used memory blocks. A complete segment can be released back from the ABT 410 to the global Freelist 140 if all contained blocks become free. Therefore, the BBA 136 can try to combine free blocks in the ABT 410 by merging the released block with its free neighbor blocks. In general, the global cache will never release completely free segments back to the system.

The current subject matter provides an optimized memory manager by implementing a hybrid thread-local-storage (TLS) access and core-striped MM. In general, multi-threaded applications can reduce synchronization between multiple processes by using the thread-local storage instead of accessing shared data memory. The open source allocator TCMalloc can be optimized for small size classes and less number of threads. By using a thread-local storage for all small blocks (less than 32 KiB) locking mechanisms are not necessary when accessing its local cache. An adverse knock-on effect is the result of having an inefficient approach in terms of memory fragmentation. Therefore, TCMalloc limits its local cache by 2 MB and reduces its size by an increasing number of threads. Problematical by using this approach is the behavior that TCMalloc performs exponentially by an increasing number of threads instead of scaling linear.

In terms of having more than 256 threads in a database system, such as the SAP HANA system, the MM can be provided such that it uses TLS access for predefined size classes. Additionally, a core-striped MM can be implemented that provides NUMA-awareness by saving all appropriate sub-allocators per predefined size class and per NUMA node at the TLS. For example, the SAP HANA system provides an integrated CPU profiler for measuring the percentage time of CPU computation. The following Table 1 shows the profiler's output when using the original HANA MM and executing 10.000.000 allocations for a block size of 64B.

TABLE 1

| Crash Dump | Size Class (byte) | Allocation Count |
|---|---|---|
| CDF_1 | 8 | 5732306618 |
| CDF_1 | 16 | 2814140519 |
| . | . | . |
| . | . | . |
| . | . | . |
| CDF_2 | 8 | 18342090 |
| CDF_2 | 16 | 12154571 |
| . | . | . |
| . | . | . |
| . | . | . |

According to the profiler results, the allocation process takes about an inclusive (total CPU time for whole function) CPU time of 32.7% and an exclusive (CPU self-time for this function) CPU time of 7.6%. Interestingly, more than 18% of the allocation function CPU time is used for locking mechanisms and additionally 17% for unlocking mechanisms. By transferring some SBAs 132 for predefined size classes into a local cache, the total time of synchronization can be reduced. Furthermore, the unlocking mechanisms and the memory allocation function itself already use the TLS.

Figure 7:
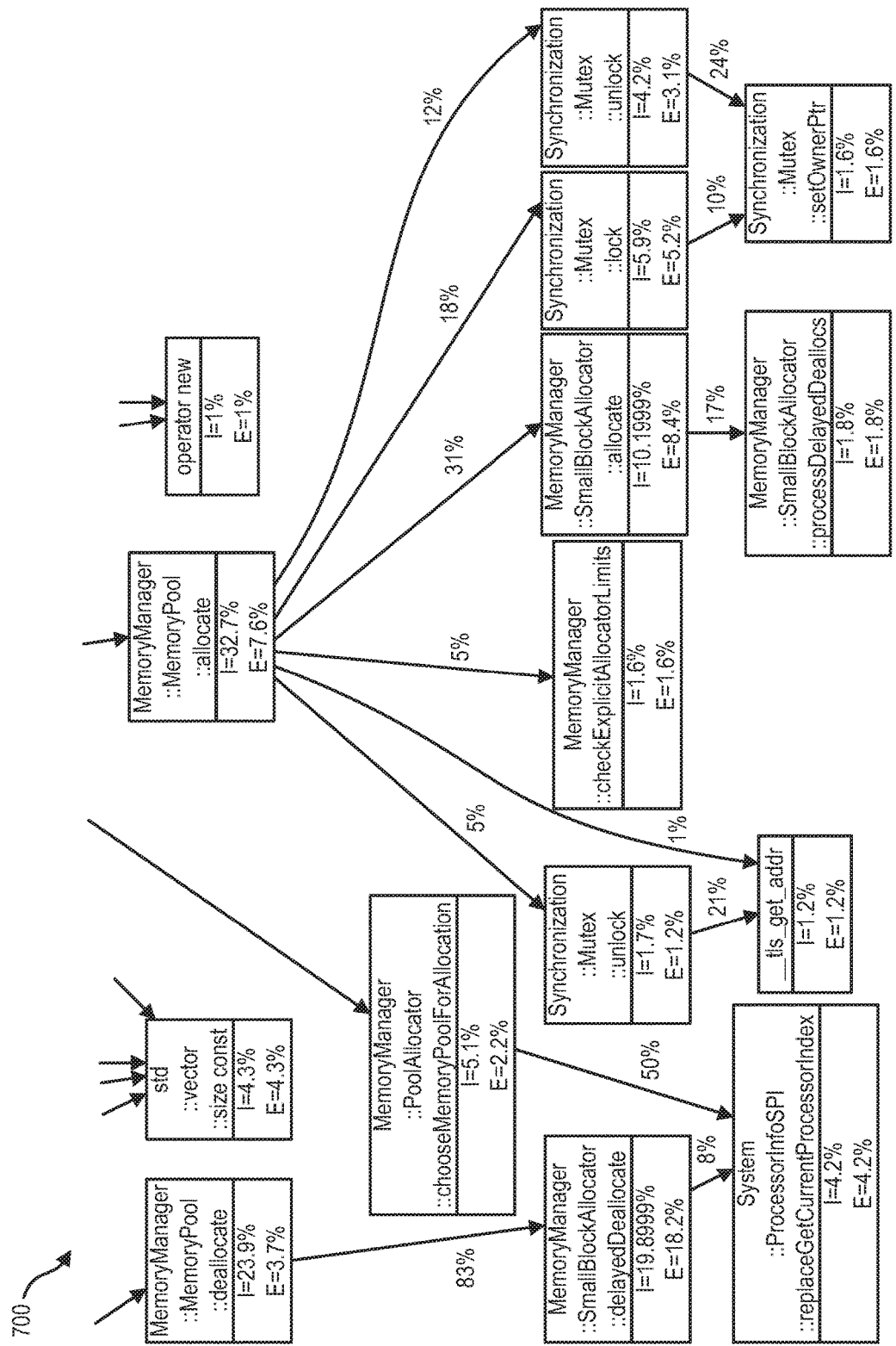
FIG. 7 is a diagram illustrating profiler results.

For determining the most frequently allocated block sizes in a particular database system, the distribution of allocation size classes should be measured. With the aid of automatically generated crashdumps generated by the MM, statistical information about the behavior of used allocators can be aggregated to calculate the number of allocations per size class. FIG. 7 is a diagram 700 illustrating profiler results in which there are 16 cores and 4 threads that provides an abstract of real numbers of allocation count per size class and per customer that have been extracted.

After aggregating all allocation counts per size class and per customer this distribution can be normalized for each customer by dividing each value by its total number of allocations. Let $NAC(c, s) \in [0, 1]$ be the normalized allocation count (NAC) per customer c and $AC(c, s) \in R \geq 0$ the appropriate allocation count respectively by taking additionally the size class s into account. Then, the distribution of allocations per customer can be defined by the following equation:

$$NAC(c, s) = \frac{AC(c, s)}{\Sigma_{i \in S} AC(c, i)} \in [0, 1]$$

With the aid of NAC(c, s) the distribution of allocation count per size class can be computed by calculating the average normalized allocation count per customer. Let $NAC(s) \in [0, 1]$ be the average allocation count per size class for all customers C, then the distribution can be defined as:

$$NAC(s) = \frac{\Sigma_{c \in C} NAC(c, s)}{|C|} \in [0, 1]$$

According to the determined distribution, small blocks are used very frequently the sampled customers that are listed below in Table 2. Corresponding to the results, the sampled customers tends to allocate small blocks very frequently, precisely 94.8% of the allocations are handled by the SBA 132, 4.6% by the PA 134 and at last only 0.6% by the BBA 136. Therefore, the MM can handle small size classes with an allocation frequency more than 4%, differently by storing them locally on the TLS. Table 2 provides a list of these predefined size classes and their appropriate average allocation count per size class.

TABLE 2

| Size Class (byte) | Average NAC | Min NAC | Max NAC |
|---|---|---|---|
| 8 | 7.61964191 | 0.02969429 | 36.82595049 |
| 16 | 5.05574751 | 0.02523141 | 21.75065705 |
| 32 | 14.37914472 | 0.78403098 | 38.68728443 |
| 48 | 5.96787791 | 0.22074598 | 13.86293613 |
| 64 | 13.62607286 | 1.16249221 | 48.79306195 |
| 80 | 10.02361198 | 0.55556890 | 36.77705118 |
| 192 | 5.85529909 | 0.01170599 | 45.25768084 |
| 576 | 4.39418108 | 0.10931413 | 12.54519590 |

Figure 8:
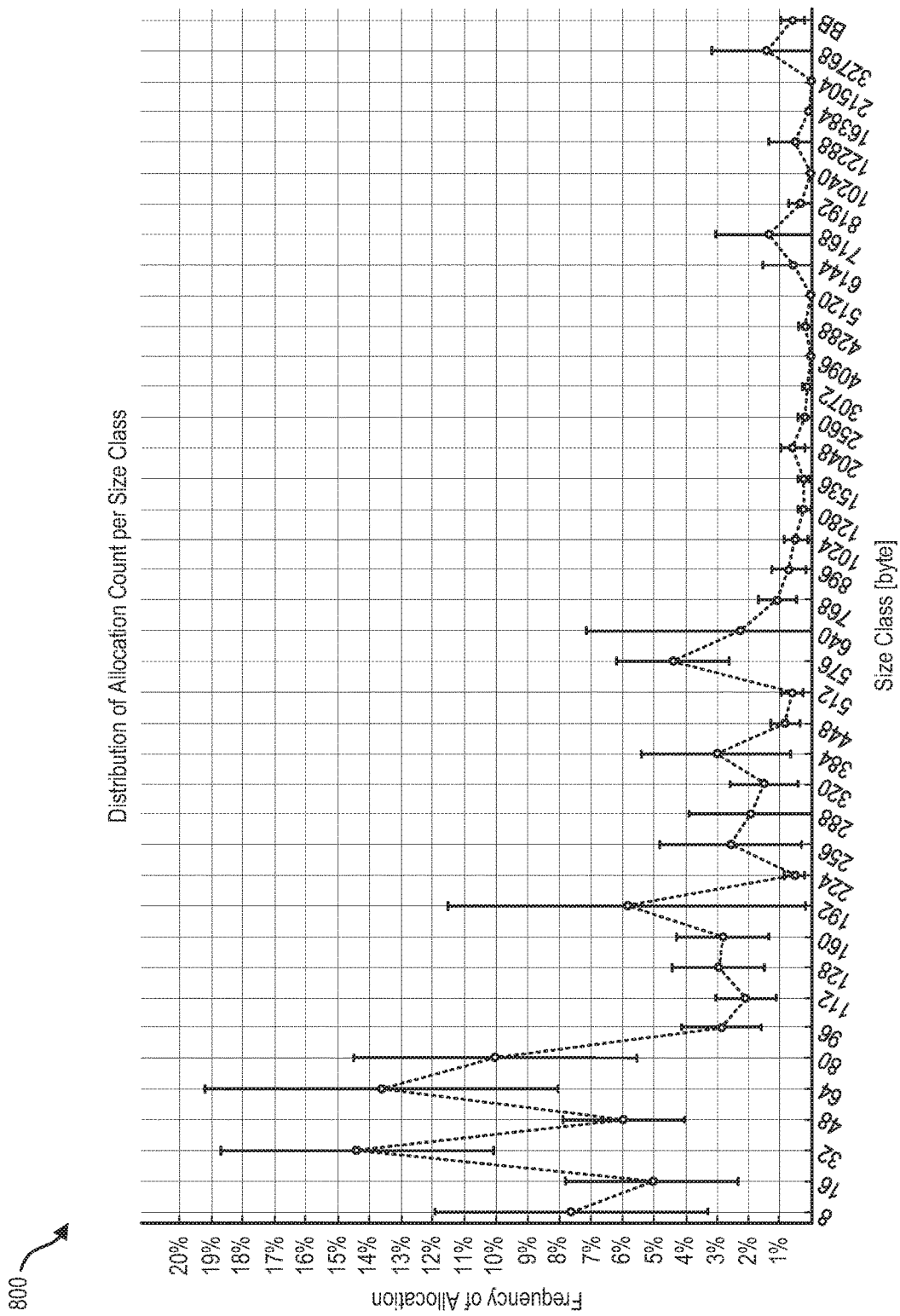
FIG. 8 is a diagram illustrating distribution of allocation count per size.

FIG. 8 is a diagram 800 that shows the distribution of most frequently allocated block sizes used by selected customers.

Figure 9:
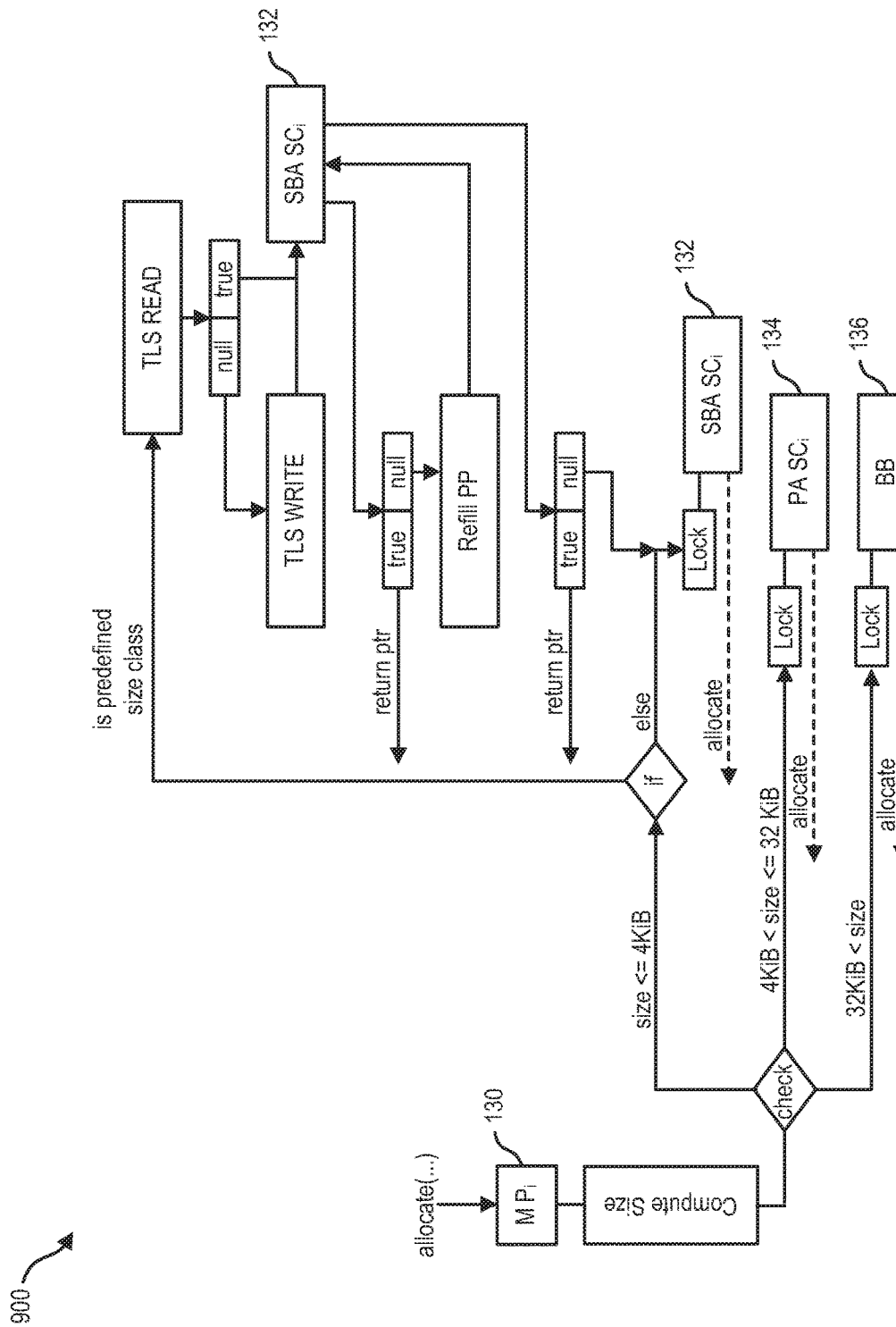
FIG. 9 is a diagram illustrating a hybrid thread local storage and core-striped memory management architecture.

FIG. 9 is a diagram 900 illustrating a hybrid TLS and core-striped MM architecture. Variables and data can be cached in the appropriate TLS by defining a key value pair (DEFINE_TLS). In terms of handling predefined size classes differently and ensuring NUMA-awareness, a TLSSmallBlockAllocator (TSBA) can be implemented that contains one SBA 132 per size class and additional per NUMA node 122 if this architecture is active. Having the fact that threads can run on different NUMA nodes 122 during the allocation process, the TSBA has to provide the possibility of caching different SBAs 132 per NUMA node 122. The following shows an example implementation of the TSBA.

Algorithm 4.1 Thread-Local-Storage: TlsSmallBlockAllocator

```
1: class TlsSmallBlockAllocator
2: {
3: public:
4:      TlsSmallBlockAllocator( ) { }
5:      ltt::auto_object<SmallBlockAllocator> m_pSBAs[8][129];
6: };
```

The auto_object can hold an object in reserved space (instead of being held in heap) and it can automatically destroy its objects when going out of scope. This two-dimensional array contains at most one SBA 132 for each predefined size class and NUMA node 122 respectively. The second index represents which of the following memory allocation policy of NUMA architecture can be used (MAX_SOCKET=128).

| | |
|---|---|
| [0, . . . ,MAX_SOCKET−1]: | NUMA node policy that implies the allocation of the appropriate node. |
| [MAX_SOCKET]: | Interleaved NUMA node that is responsible to spread out pages and memory accesses across multiple nodes. |

With regard to memory allocation, after calling the allocation function by the appropriate MP 130, the requested size class has to be determined. In contrast to previous approaches, the locking mechanisms might be unneeded at the beginning, precisely if the requested block size fits to the predefined size classes: 8B, 16B, 32B, 64B, 80B, 192B or 576B. In addition, frequently used size classes could be inserted dynamically into the TLS by monitoring the allocation process and its allocator statistics during running time. FIG. 9 illustrates the approach for allocating memory by using the hybrid TLS access and core-striped MM and shows the new position of locks. After determining the appropriate sub-allocator for handling the memory request, locking mechanisms are essential if the allocation is carried out by the PA 134 or BBA 136. Memory allocations for small block sizes can be handled differently by the appropriate MP 130, depending if the size fits to the predefined size class. By having a corresponding size class, the MP 310 can take the TSBA by accessing the TLS, by calling TLS READ, and try to return a valid SBA pointer. If the TLS returns an invalid pointer, a new TSBA can be created and additionally saved into the TLS by using the call TLS_WRITE. Afterwards, the appropriate SBA 132 can try to allocate the requested memory blocks. If the SBA 132 needs more free logical pages for its Freelist 210, locking mechanisms are necessary, because the free logical pages originates from the PP's Freelist that is shared by all threads per MP 130.

In order to demonstrate the benefits of the current subject matter, a conventional MM and the current hybrid TLS and core-striped MM were evaluated and compared with the standard allocator ptmalloc2 and TCmalloc. For comparing the performance of different open source memory allocators with the customized allocator provided herein, a test script has been implemented to analyze the performance of each allocator respectively. Precisely as TCmalloc, the underlying conventional MM provides a flexible way to use the appropriate allocator by setting the LD_PRELOAD environment variable. Therefore, the implemented test script was based on C++ and used the functions malloc to allocate memory from the system and free to deallocate requested memory. The following algorithm provides the principle implementation of the underlying test script and shows the approach of the functions allocateMemory, deallocateMemory and run Test in detail.

```
1: void allocateMemory(std::vector<void*>& vec)
2: {
3:      if (WRITE)
4:      {
5:          char* ptr = reinterpret_cast<char*>(malloc(BLOCK_SIZE));
6:          for (size_t i = 0; i < BLOCK_SIZE; i += 4096)
7:              *(ptr + i) = 'x';
8:          vec.push_back(ptr);
9:      }
10:     else
11:         vec.push_back(malloc(BLOCK_SIZE));
12: }
13:
14: void deallocateMemory(RNG& rng, std::vector<void*>& vec)
15: {
16:     if (USE_RANDOM_ACCESS)
17:     {
18:         int index = rng.get(vec.size( ));
19:         free(vec.at(index));
20:         vec[index] = vec.back( );
21:         vec.pop_back( );
22:     }
23:     else
24:     {
25:         free(vec.back( ));
26:         vec.pop_back( );
27:     }
28: }
29:
30: void* runTest(void *threadId)
31: {
32:     RNG rng;
33:     int counter = 0;
34:     std::vector<void*> vec;
35:
36:     while (counter < NUM_ALLOCATIONS)
37:     {
38:         while ((vec.size( ) < MAX) && (counter < NUM_ALLOCATIONS))
39:         {
40:             allocateMemory(vec);
41:             counter++;
42:         }
43:
44:         while (vec.size( ) > MIN)
45:             deallocateMemory(rng, vec);
46:     }
47:
48:     while (vec.size( ) > 0)
49:         deallocateMemory(rng, vec);
50:
51:     return 0;
52: }
```

The principle approach of this test script is to allocate heap memory blocks like a saw wave by executing more allocations than deallocations first. Therefore, NUM_ALLOCATIONS defines the total number of allocations, whereas MAX and MIN represent the upper and lower bound per allocation and deallocation cycle. This test script differentiates between two different approaches when allocating heap memory blocks. Firstly, the allocation of an empty pointer with the requested block size or secondly, by writing the character x to the aligned pointer. The vector, that contains all previously allocated pointers, can accessed randomly for the deallocation of its pointer by setting the flag USE_RANDOM_ACCESS.

In terms of analyzing the allocation process by running the test script with different numbers of threads or by varying the requested block size, we need to provide a flexible test script to test the allocators with varied settings. The following Table 3 provides an overview of some parameters that can be set.

TABLE 3

| Parameter | Description |
| --- | --- |
| BLOCK_SIZE (byte) | Requested block size in byte. |
| NUM_THREADS | Number of threads used to allocate predefined blocks. |
| NUM_LISTENERS | Number of listener threads that are waiting. |
| NUM_ALLOCATIONS | Total number of allocations. |
| MAX | Upper bound of allocations for one cycle. |
| MIN | Lower bound of allocations for one cycle. |
| VERBOSE | Display more information about actual steps. |
| WRITE | Allocate a written pointer. |
| USE_RANDOM_ACCESS | Access vector randomly for releasing a stored pointers. |

In terms of implementing a hybrid TLS and core-striped MM, which exploit the phenomenon that small size classes are used very frequently, the distribution of allocations depending on the size class has to be considered. Therefore, a measurement is defined that determines the expected average time per allocation depending on the underlying allocator. Let $\sigma(s) \in [0, 1]$ be the probability for an allocation with the size class s respectively to the previously determined distribution of allocations per size class. Additionally, the following equation has to be hold: $E s \in S \ \sigma(s)=1$, with $S=\{8, 16, \ldots, 130000\}$ representing all possible size classes.

TABLE 4

$\sigma(8) = 0.076196419$
$\sigma(16) = 0.050557475$
$\sigma(32) = 0.143791447$
$\sigma(48) = 0.059678779$
$\sigma(64) = 0.136260729$
$\sigma(80) = 0.10023612$
$\sigma(96) = 0.028520353$
$\sigma(112) = 0.020700133$
$\sigma(128) = 0.029680264$
$\sigma(160) = 0.028196846$
$\sigma(192) = 0.058552991$
$\sigma(224) = 0.005322676$
$\sigma(256) = 0.025774499$
$\sigma(288) = 0.019249801$
$\sigma(320) = 0.01502039$
$\sigma(384) = 0.030250401$
$\sigma(448) = 0.008501341$
$\sigma(512) = 0.006168708$
$\sigma(576) = 0.043941811$
$\sigma(640) = 0.022512231$
$\sigma(768) = 0.011069702$
$\sigma(896) = 0.007305233$
$\sigma(1024) = 0.005273385$
$\sigma(1280) = 0.002469256$
$\sigma(1536) = 0.002609192$
$\sigma(2048) = 0.006037987$
$\sigma(2560) = 0.002252136$
$\sigma(3072) = 0.001534785$
$\sigma(4096) = 0.000303905$
$\sigma(4288) = 0.002065382$
$\sigma(5120) = 0.000400079$
$\sigma(6144) = 0.005599875$
$\sigma(7168) = 0.0135758$
$\sigma(8192) = 0.003510983$
$\sigma(10240) = 0.000266919$
$\sigma(12288) = 0.005180048$
$\sigma(16384) = 0.000985361$
$\sigma(21504) = 0.000273581$
$\sigma(32768) = 0.014098755$
$\sigma(34000) = 0.000867746$ TABLE 4-continued $\sigma(50000) = 0.000867746$
$\sigma(66000) = 0.000867746$
$\sigma(82000) = 0.000867746$
$\sigma(98000) = 0.000867746$
$\sigma(114000) = 0.000867746$
$\sigma(130000) = 0.000867746$ Based on this distribution of allocations per size class and the measured performance test results T, we can define the expected performance improvement E as follows:

$$E[\text{SIZE}, \#\text{THREADS}, \text{SYSTEM}] = \sum_{s \in S} \sigma(s) \cdot T(\text{SIZE}, \#\text{THREADS}, \text{SYSTEM}, s)$$

According to this equation, the expected performance improvement depends on the requested block size and the underlying system, that defines which allocator (eg., TCMalloc, or MM) is used, and the total number of worker threads. Additionally, SYSTEM takes into account if the underlying MM is using multiple NUMA nodes and if the system is having the usage of Transparent Huge Pages (THP) enabled or not.

With the aid of this measurement E, the conventional MM can be analyzed and can be compared to the standard allocator ptmalloc2 and TCMalloc. Additionally, the performance of a hybrid TLS and core-striped MM has to be determined for reviewing a possible improvement. Therefore, by measuring the performance of each system for different size classes and a varied number of threads (A), the expected performance improvement for several MMs was determined.

Figure 10:
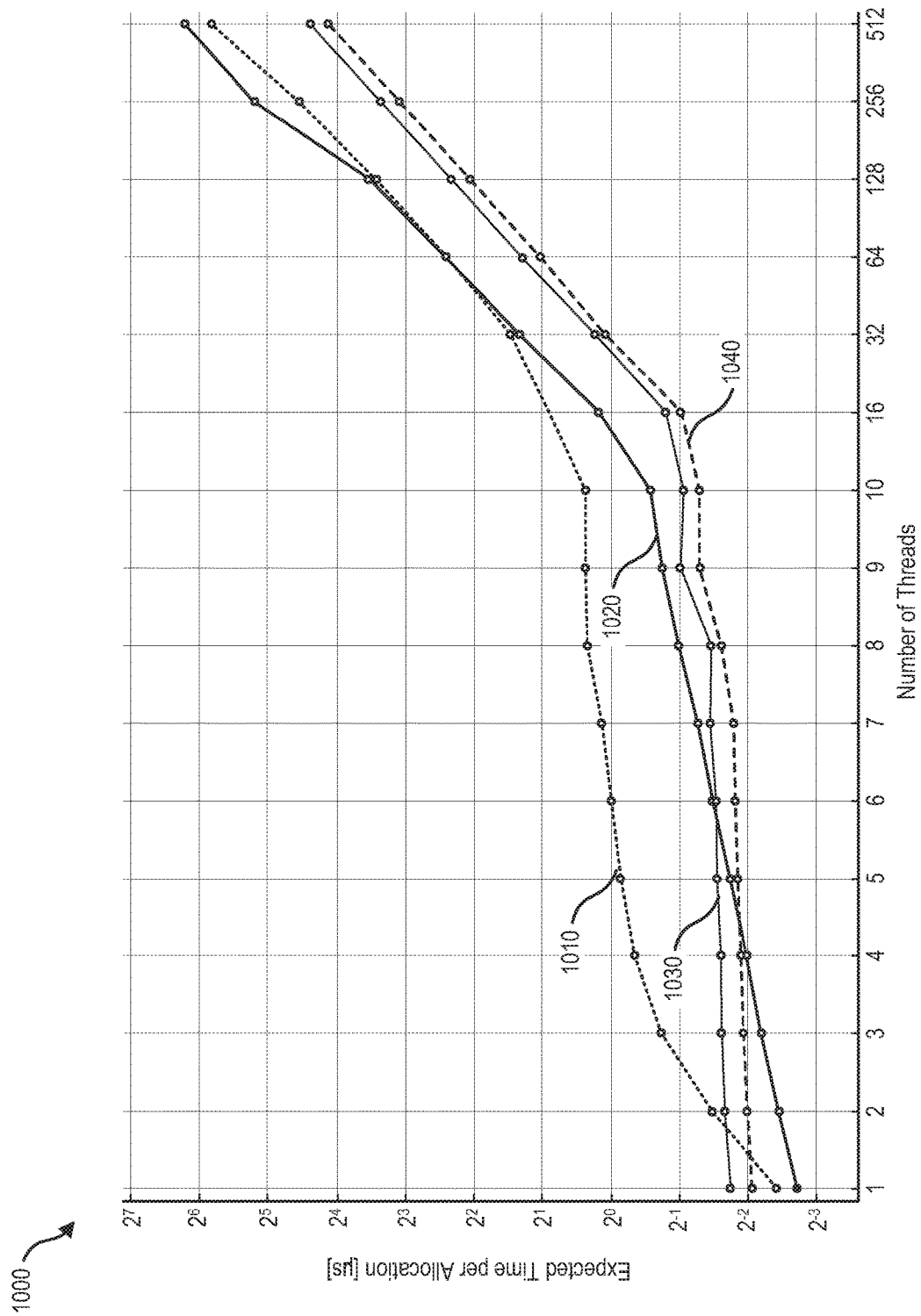
FIG. 10 is a diagram illustrating performance results of the hybrid thread local storage and core-striped memory management techniques as compared to conventional techniques.

FIG. 10 shows the expected performance improvement by using the hybrid TLS and core-striped MM 1040 and by disabling the determination of statistics during the allocation process on a HP Z600 Workstation (Intel Xeon X5550@2.67 GHz, 16 logical cores, 23.5 GiB memory) in relation to ptmalloc2 1010, TCMalloc 1020, and a conventional MM 1030.

According to this performance results, TCMalloc 1020 allocates extremely fast when having less number of threads, whereas the underlying conventional MM 1030 scales linear even for an increasing number of threads and intersects the TCMalloc curve by having six threads. FIG. 10 demonstrates that the use of a hybrid, combined TLS and core-striped MM can lead to a performance improvement of 9.1%. Furthermore, disabling all statistics leads to a speedup of additional 7.8% on working stations consisting of new hardware.

Figure 11:
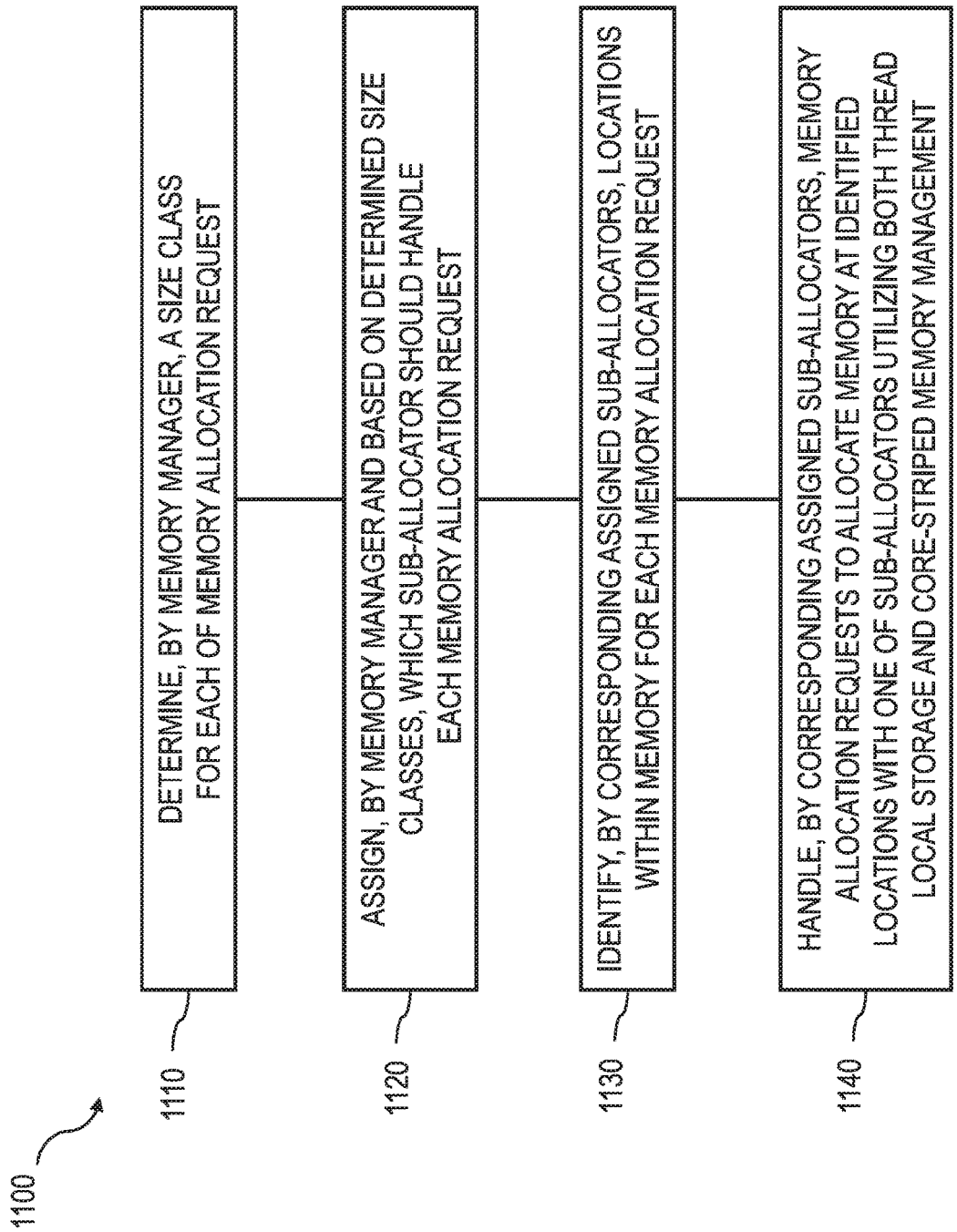
FIG. 11 is a process flow diagram illustrating execution of a thread local storage and core-striped memory management process.

FIG. 11 is a process flow diagram 1100 for memory management in which, at 1110, it is determined, by a memory manager of a database for each of a plurality of memory allocation requests, a size class for each such memory allocation request. Subsequently, at 1120, the memory manager assigns, based on the determined size classes, which of a plurality of sub-allocators forming part of a plurality of memory pools should handle each memory allocation request. The sub-allocators assignments are based on predefined size ranges for each size class. Further, at 1130, the corresponding assigned sub-allocators identify locations within the memory for each memory allocation request. Next, at 1140, the corresponding assigned sub-allocators handle the memory allocation requests to allocate memory at the identified locations such that one of the sub-allocators utilizing both thread local storage and core-striped memory management.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for implementation by one or more data processors forming part of at least one computing device, the method comprising:
   determining, by a memory manager of a database, a size class for each of a plurality of memory allocation requests;
   assigning, by the memory manager and based on the determined size classes, which of a plurality of sub-allocators forming part of a plurality of memory pools should handle each memory allocation request, the sub-allocators assignments being based on predefined size ranges for each size class;
   identifying, by the corresponding assigned sub-allocators, locations within the memory for each memory allocation request; and
   handling, by the corresponding assigned sub-allocators, the memory allocation requests to allocate memory at the identified locations, wherein one of the sub-allocators utilizes both thread local storage and core-striped memory management;
   wherein the thread local storage includes storage that is local to a thread;
   wherein the core-striped memory management includes management of a striped memory including logically segmented data that is segmented on different nodes of a distributed database system comprising a plurality of distributed nodes.

2. The method of claim 1, wherein the database is an in-memory database using main memory for data storage such that the memory allocation requests are for such main memory.

3. The method of claim 1, wherein each sub-allocator has a corresponding memory pool which handles the corresponding memory allocation requests.

4. The method of claim 1, wherein the sub-allocators comprise a small block allocator, a page allocator, and a big block allocator, wherein memory allocation requests having a size class below a first threshold are handled by the small block allocator, memory allocation requests having a size class below a second threshold which is greater than the first threshold are handled by the page allocator, and other memory allocation requests are handled by the big block allocator.

5. The method of claim 4, wherein the small block allocator is the sub-allocator utilizing thread local storage (TLS) comprising requesting a pointer to a small block allocator in response to determining that a memory allocation request is equal to a predefined size range, and core-striped memory management comprising executing a locking operation on the small block allocator in response to determining that the memory allocation request is not equal to the predefined size range.

6. The method of claim 5 further comprising:
determining, by a TLS small block allocator associated with the small block allocator, a sub-size class for each such memory allocation request;
wherein the TLS small block allocator handles the memory allocation requests for the small block allocator.

7. The method of claim 4, wherein the small block allocator and the page allocator obtain free logical pages from a page provider, the page provider obtaining free logical pages from the big block allocator.

8. A system comprising:
at least one data processor; and
memory storing instructions which, when executed by the at least one data processor, result in operations comprising:
determining, by a memory manager of a database, a size class for each of a plurality of memory allocation requests;
assigning, by the memory manager and based on the determined size classes, which of a plurality of sub-allocators forming part of a plurality of memory pools should handle each memory allocation request, the sub-allocators assignments being based on predefined size ranges for each size class;
identifying, by the corresponding assigned sub-allocators, locations within the memory for each memory allocation request; and
handling, by the corresponding assigned sub-allocators, the memory allocation requests to allocate memory at the identified location, wherein one of the sub-allocators utilizes both thread local storage and core-striped memory management;
wherein the thread local storage includes storage that is local to a thread;
wherein the core-striped memory management includes management of a striped memory including logically segmented data that is segmented on different nodes of a distributed database system comprising a plurality of distributed nodes.

9. The system of claim 8 further comprising: the database, wherein the database is an in-memory database using main memory for data storage such that the memory allocation requests are for such main memory.

10. The system of claim 8, wherein each sub-allocator has a corresponding memory pool which handles the corresponding memory allocation requests.

11. The system of claim 8, wherein the sub-allocators comprise a small block allocator, a page allocator, and a big block allocator, wherein memory allocation requests having a size class below a first threshold are handled by the small block allocator, memory allocation requests having a size class below a second threshold which is greater than the first threshold are handled by the page allocator, and other memory allocation requests are handled by the big block allocator.

12. The system of claim 11, wherein the small block allocator is the sub-allocator utilizing both thread local storage (TLS) and core-striped memory management.

13. The system of claim 12 further comprising:
determining, by a TLS small block allocator associated with the small block allocator, a sub-size class for each such memory allocation request;
wherein the TLS small block allocator handles the memory allocation requests for the small block allocator.

14. The system of claim 11, wherein the small block allocator and the page allocator obtain free logical pages from a page provider, the page provider obtaining free logical pages from the big block allocator.

15. A non-transitory computer program product storing instructions which, when executed by at least one data processor forming part of at least one computing system, result in operations comprising:
determining, by a memory manager of an in-memory database, a size class for each of a plurality of memory allocation requests, the in-memory database using main memory for data storage such that the memory allocation requests are for such main memory;
assigning, by the memory manager and based on the determined size classes, which of a plurality of sub-allocators forming part of a plurality of memory pools should handle each memory allocation request, the sub-allocators assignments being based on predefined size ranges for each size class;
identifying, by the corresponding assigned sub-allocators, locations within the memory for each memory allocation request; and
handling, by the corresponding assigned sub-allocators, the memory allocation requests to allocate memory at the identified locations, wherein one of the sub-allocators utilizes both thread local storage and core-striped memory management;
wherein the thread local storage includes storage that is local to a thread;
wherein the core-striped memory management includes management of a striped memory including logically segmented data that is segmented on different nodes of a distributed database system comprising a plurality of distributed nodes.

16. The computer program product of claim 15, wherein each sub-allocator has a corresponding memory pool which handles the corresponding memory allocation requests.

17. The computer program product of claim 16, wherein the sub-allocators comprise a small block allocator, a page allocator, and a big block allocator, wherein memory allocation requests having a size class below a first threshold are handled by the small block allocator, memory allocation requests having a size class below a second threshold which is greater than the first threshold are handled by the page allocator, and other memory allocation requests are handled by the big block allocator.

18. The computer program product of claim 17, wherein the small block allocator is the sub-allocator utilizing both thread local storage (TLS) and core-striped memory management.

19. The computer program product of claim 18 further comprising:
determining, by a TLS small block allocator associated with the small block allocator, a sub-size class for each such memory allocation request;

wherein the TLS small block allocator handles the memory allocation requests for the small block allocator.

20. The computer program product of claim 19, wherein the small block allocator and the page allocator obtain free logical pages from a page provider, the page provider obtaining free logical pages from the big block allocator.

21. The method of claim 5, wherein the small block allocator includes a pointer to a doubly-connected linked-list that contains partially free logical pages, the small block allocator originates free blocks from a local freelist, and a page provider provides logical free pages originated by the big block allocator.

* * * * *